(12) United States Patent
Park (10) Patent No.: US 8,201,008 B2
(45) Date of Patent: Jun. 12, 2012

(54) BATTERY MODULE, COMPUTER SYSTEM AND POWER SUPPLY METHOD THEREOF

(75) Inventor: Jeong-gyu Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1256 days.

(21) Appl. No.: 11/853,991

(22) Filed: Sep. 12, 2007

(65) Prior Publication Data

US 2008/0172566 A1 Jul. 17, 2008

(30) Foreign Application Priority Data

Jan. 11, 2007 (KR) .................. 10-2007-0003509

(51) Int. Cl.
*G06F 1/00* (2006.01)
(52) U.S. Cl. ...................... 713/340; 713/300
(58) Field of Classification Search ............... 713/300, 713/340
See application file for complete search history.

(56) References Cited

U.S. PATENT DOCUMENTS

| 5,300,874 | A | * | 4/1994 | Shimamoto et al. | 320/106 |
| 5,315,533 | A | * | 5/1994 | Stich et al. | 700/298 |
| 5,381,554 | A | * | 1/1995 | Langer et al. | 714/14 |
| 5,557,188 | A | * | 9/1996 | Piercey | 320/134 |
| 5,978,236 | A | * | 11/1999 | Faberman et al. | 363/37 |
| 6,121,695 | A | * | 9/2000 | Loh | 307/64 |
| 6,195,754 | B1 | * | 2/2001 | Jardine et al. | 713/324 |
| 6,463,545 | B1 | * | 10/2002 | Fisher et al. | 713/340 |
| 2002/0011823 | A1 | * | 1/2002 | Lee | 320/137 |
| 2004/0010649 | A1 | * | 1/2004 | Weaver et al. | 710/302 |
| 2004/0010725 | A1 | * | 1/2004 | Chan | 713/300 |
| 2004/0263123 | A1 | * | 12/2004 | Breen et al. | 320/128 |
| 2005/0034003 | A1 | * | 2/2005 | Sato et al. | 713/340 |
| 2005/0267999 | A1 | | 12/2005 | Suematsu et al. | |
| 2007/0210652 | A1 | * | 9/2007 | Tracy et al. | 307/66 |

FOREIGN PATENT DOCUMENTS

| CN | 1501214 | 6/2004 |
| CN | 1702600 | 11/2005 |
| JP | 7-31079 | 1/1995 |
| KR | 1999-1090 | 1/1999 |
| KR | 1999-40595 | 6/1999 |
| KR | 2004-31432 | 4/2004 |

OTHER PUBLICATIONS

Chinese Office Action issued on Jul. 27, 2011 in CN application No. 200710301926.4.
Chinese Office Action issued on Oct. 13, 2010 in CN application No. 200710301926.4.

* cited by examiner

*Primary Examiner* — Mark Connolly
(74) *Attorney, Agent, or Firm* — Stanzione & Kim, LLP (57) ABSTRACT

A battery module usable with a computer system includes a circuit to generate a power, and a controller to output the power of the circuit to an external device, for example, the computer system, and to prevent the power from being output from the circuit to the external device according to an external signal received from the external device. The computer system includes a circuit to receive the power from the battery module, a second circuit to generate another power other than the power of the battery module, and a second controller to generate a detection signal as the external signal according to existence of the another power of the second circuit. The circuit may include an adapter to receive an extern power from an external power source and a battery to receive the external power from the adapter or to generate an auxiliary power and the power.

18 Claims, 5 Drawing Sheets

BATTERY MODULE, COMPUTER SYSTEM AND POWER SUPPLY METHOD THEREOF

CROSS-REFERENCE TO RELATED APPLICATIONS

This application claims priority from Korean Patent Application No. 10-2007-0003509, filed on Jan. 11, 2007, in the Korean Intellectual Property Office, the disclosure of which is incorporated herein in its entirety by reference.

BACKGROUND OF THE INVENTION

1. Field of the Invention

The present general inventive concept relates to a battery module, a computer system and a power supply method thereof, and more particularly, to a battery module which supplies an external power, and a computer system and a power supply method thereof.

2. Description of the Related Art

A portable computer, such as a notebook computer and a personal digital assistant (PDA), becomes popular due to its portability. Such a portable computer may use an external power through an AC/DC adaptor. Also, the portable computer uses a secondary battery which is recharged through the adaptor.

An extended battery life (EBL) technique has been used to extend a battery life span, among various techniques related to batteries of the portable computer. Thus, a narrow voltage direct current (NVDC) technique has been suggested as one of the battery-related techniques. The NVDC technique reduces a voltage range of a voltage direct current (VDC) inputted to a DC/DC converter which converts power from an adapter or battery into power within a voltage range to drive respective components of the portable computer.

Figure 1:
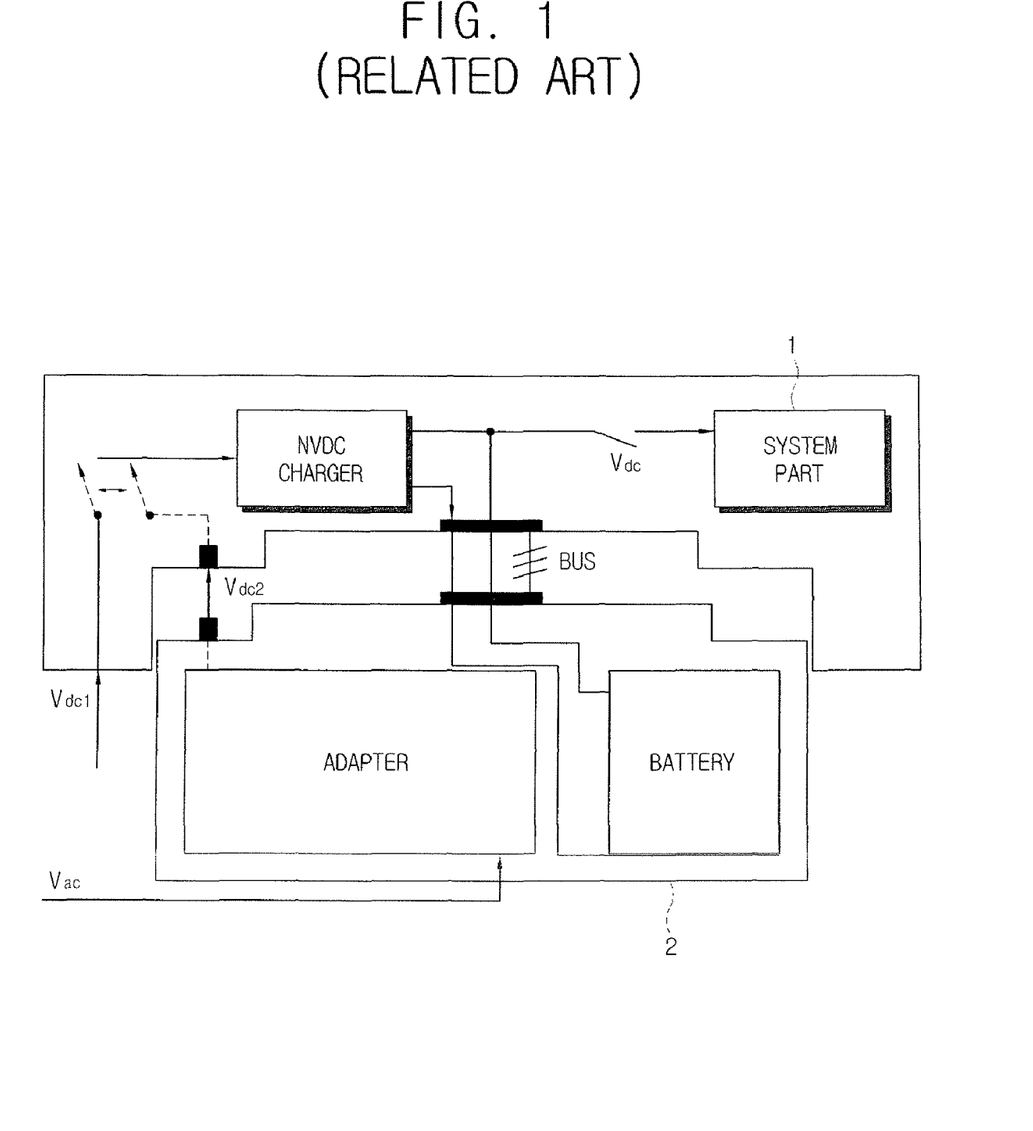
FIG. 1 is a block diagram illustrating a conventional computer system.

The portable computer which employs the NVDC technique may have a power supply in which an adaptor and a battery are formed as a single body. As illustrated in FIG. 1, the power supply supplies power Vdc in different ranges to a system part 1 through a switch, by receiving a voltage of Vdc1 from an external adaptor or a voltage Vdc2 from an adapter of a battery module 2, and by receiving a voltage of 9V to 12.6V from a battery of the battery module 2.

However, the external adapter and the integrated battery module 2 require an additional cable which is exposed to an outside thereof, to supply power to the system part 1. Since, the portable computer is supplied with a first external power from the adapter of the battery module 2, a second external power additionally from the outside or an auxiliary power from the battery, it needs several switches to prevent a short-circuit due to potential differences among the first external power, the second external power, and the auxiliary power supplied from the battery. Then, the power connection becomes complicated, thereby causing inconvenience in carrying the portable computer and the risks of the short-circuit.

SUMMARY OF THE INVENTION

The present general inventive concept provides a battery module which has a simplified power supply configuration and prevents a short-circuit by determining whether an external power is supplied separately from an integrated battery module and by cutting off power supplied from the integrated battery module if the external power is supplied, and a computer system and a power supply method thereof.

Additional aspects and/or advantages of the present general inventive concept will be set forth in part in the description which follows and, in part, will be obvious from the description, or may be learned by practice of the present general inventive concept.

The foregoing and/or other aspects and utilities of the present general inventive concept can be achieved by providing a battery module usable with a computer system, the battery module including an interface port to receive an external signal, and a controller to output a power through the interface port, and to prevent the power from being transmitted to the interface port according to the external signal received through the interface port.

The interface port may be connectable to an external computer system to receive the external signal from the external computer system, and the power may be transmitted to the external computer system through the interface port.

The interface port may be connectable to an external computer system to receive the external signal the external computer system, and the external signal may represent that the external computer system receives a second power from an external power source other than the power from the interface port.

The interface port may be connectable to an external computer system to receive the external signal from the external computer system, such that the power is supplied to the external computer system through the interface port and the external signal is supplied from the external computer system to the controller through the interface port.

The interface port may include a plurality of signal lines, and the power and the external signal may be transmitted through corresponding ones of the plurality of signal lines of the interface port.

The battery module may further include an interface connected to the interface port to transmit the power to the interface port and to transmit the external signal received from the interface port to the controller.

The interface may include a power line to transmit the power and a data line to transmit the external signal.

The battery module may further include a battery to generate an auxiliary power as the power, and the controller may prevent the auxiliary power from being transmitted to the port according to the external signal received through the interface port.

The battery module may further include a power port connectable to an external power source to receive an external power; and a battery to generate an auxiliary power, and the controller may selectively supply one of the external power and the auxiliary power as the power to the interface port, and prevent at least the one of the external power and the auxiliary power from being transmitted to the interface port, according to the signal.

The battery module may further include a power port to receive an external power, a battery, and a switch connected between the interface port and at least one of the power port and the battery, and the controller may control the switch to supply the external power to the battery to charge the battery, and to supply the external power to the interface port as the power.

The foregoing and/or other aspects and utilities of the present invention general inventive concept can also be achieved by providing a battery module usable with a computer system, the battery module including a circuit to generate a power, and a controller to output the power of the circuit to an external device, and to prevent the power from being output from the circuit to the external device according to an external signal received from the external device.

The foregoing and/or other aspects and utilities of the present invention general inventive concept can also be achieved by providing a battery module usable with a computer system, the battery module including an interface port connectable to an external device, an interface to receive an external signal from the external device through the interface port, and a controller to control the interface to output a power to through the interface port, and to prevent the power from being transmitted to the interface according to the received external signal.

The foregoing and/or other aspects and utilities of the present invention general inventive concept can also be achieved by providing a battery module usable with a computer system, the battery module including an interface port to receive an external signal; and a circuit to output a power, an interface connected between the circuit and the interface port, and a controller to controls at least one of the circuit and the interface to output the power through the interface port, and to prevent the power from being transmitted to the interface port according to the received external signal.

The circuit may include an adapter to generate an external power and a battery to generate an auxiliary power, and the controller may selectively output one of the external power and the auxiliary power as the power.

The adapter and the battery may be formed in a single body.

The foregoing and/or other aspects and utilities of the present invention general inventive concept can also be achieved by providing a battery module usable with a compute system, including a power port to receive a first power from a first external power source, a battery to generate an auxiliary power, an interface port connectable to an external computer system, and a controller to transmit one or the first power and the auxiliary power to the interface port, and to prevent the first power and the auxiliary power from being transmitted to the interface port according to a signal received from the external computer system through the interface port.

The foregoing and/or other aspects and utilities of the present invention general inventive concept can also be achieved by providing a computer system including a computer body comprising an system interface port connectable to an interface port of an external battery module to receive a power from the external battery module, and a controller to generate an external signal to the interface port of the external battery module through the system interface such that the external battery module terminates the supply of the power through the interface according to an existence of another power other than the power of the external battery module The foregoing and/or other aspects and utilities of the present invention general inventive concept can also be achieved by providing a computer system including a system part, a circuit to generate a power to the system part, a second circuit to receive another power from an external device to be supplied to the system part, and a controller to generate a detection signal to the external device according to the existence of the power of the circuit such that the external device terminates the supply of the another power to the second circuit.

The foregoing and/or other aspects and utilities of the present invention general inventive concept can also be achieved by providing a computer system including a battery module comprising an interface port to receive an external signal, and a controller to transmit a power to the interface port and to prevent the power from being transmitted to the interface port according to the external signal received through the interface port; and a computer body comprising a system interface port connectable to the interface port of the battery module to receive the power from the battery module, and a second controller to generate a detection signal as the external signal to the battery module according to an existence of another power other than the power of the external battery module such that the external battery module terminates the supply of the power through the interface according to the external signal.

The battery module may further include a power port connectable to a first external power source to receive a first external power from the first external power source, and the computer body may include a second power port connectable to a second external power source to receive a second external power as the another power from the second external power source and generates the external signal when the second external power is supplied as the another power to the computer body from the second external power source, to terminate the supply of the power from the battery module.

The battery module may include a battery to generate an auxiliary power as the power; and the computer body may include a battery power supply to generate a second power and generates the external signal when the second power is supplied to the computer body, to terminate the supply of the power from the battery module.

The battery module may include a circuit having an adapter and a battery to generate an external power and an auxiliary power as the power, and the circuit may include a single integrated circuit to include the adapter and the battery.

The computer body may include a system part, a power port connectable to an external power source, an external power source supply to receive another power from the external power source and to transmit the another power to the system part, a battery power supply having a battery to be charged with the another power from the external power source, a controller to receive the existence of the another power from the system part to generate the external signal to terminate the supply of the first external power, and to control the battery power supply to be charged with the second external power and discharge an auxiliary power to the system part according to a state of the second external power, and an interface to communicate with the interface port of the battery module through the interface port of the computer body.

The another power may have a higher priority than the power of the battery module such that the another power is supplied to the computer body regardless of the power of the battery module supplied to the computer body.

The foregoing and/or other aspects and utilities of the present invention general inventive concept can also be achieved by providing a computer system including a battery module comprising a port and a controller to transmit a power to the port and to prevent the power from being transmitted to the port according to a signal received through the port, and a computer body comprising another port connectable to the port of the battery module and another controller to transmit the signal to the port through the another port according to existence of another power other than the battery module, so that the battery module does not transmit the power to the another port through the port.

The foregoing and/or other aspects and utilities of the present invention general inventive concept can also be achieved by providing a method of a battery module usable with a computer system, the method including receiving an external signal through an interface port of the battery module, and outputting a power through the interface port; and preventing the power from being transmitted to the interface port according to the external signal received through the interface port.

The foregoing and/or other aspects and utilities of the present invention general inventive concept can also be achieved by providing a method of a computer system, the method including receiving a power from an external battery module, generating an external signal to the external battery module when receiving another power other than the power of the external battery module, and outputting the external signal to the external battery module so that the external battery module terminates the supply of the power according to the external signal.

The foregoing and/or other aspects and utilities of the present invention general inventive concept can also be achieved by providing a method of a computer system having a battery module, the method including connecting a battery module to a computer system, controlling the battery module to output a power from the battery module to the computer system; controlling the computer system to generate an external signal when the computer receives another power other than the power of the battery module, controlling the computer system to output the external signal to the battery module, and controlling the battery module to prevent the power from being transmitted from the battery module to the computer system according to the external signal.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
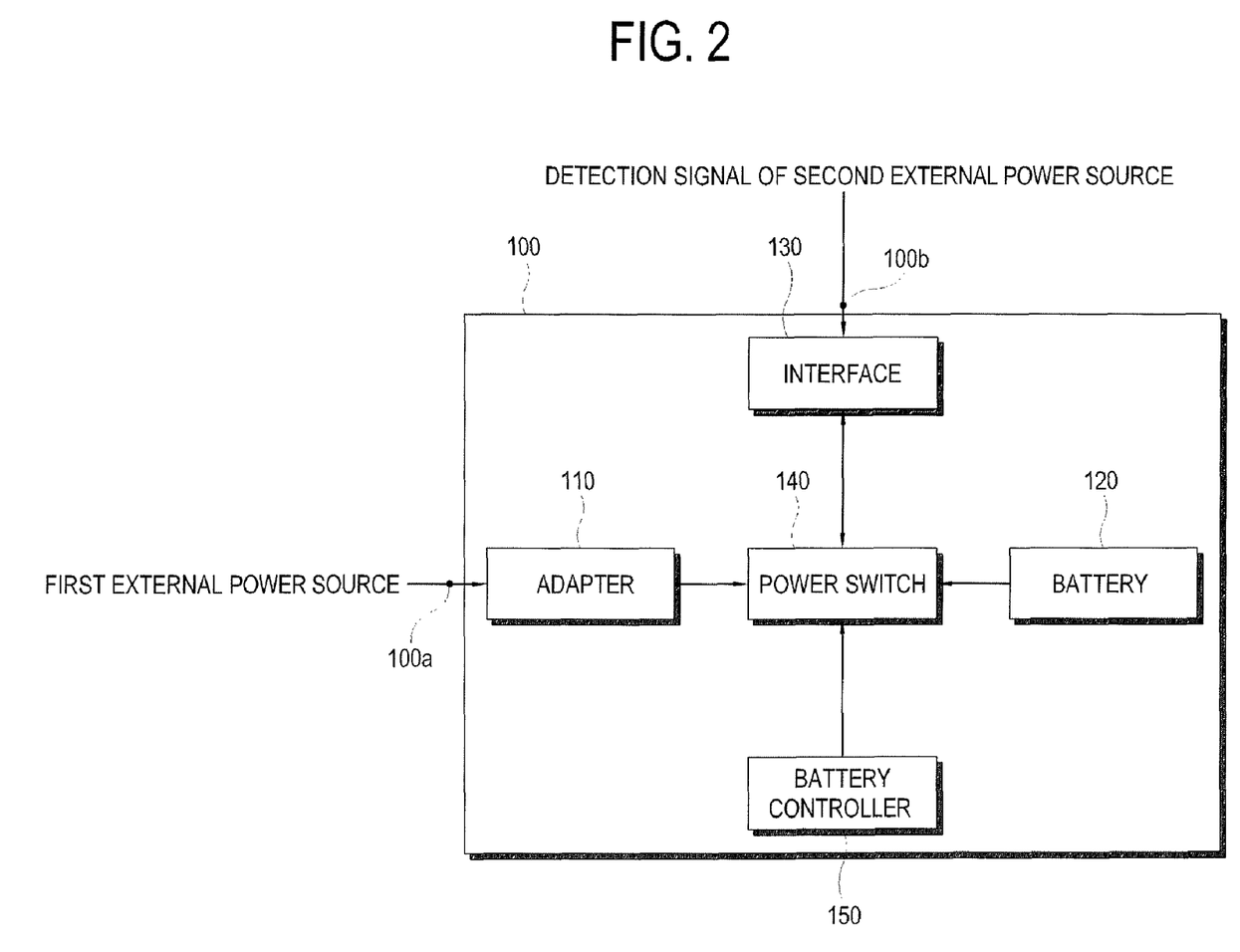
FIG. 2 is a block diagram of a battery module usable with a computer system according to an embodiment of the present general inventive concept.

FIG. 2 is a block diagram of a battery module 100 usable with a computer system according to an embodiment of the present general inventive concept. Referring to FIG. 2, the battery module 100 may include an adapter 110, a battery 120, an interface 130, a power switch 140, and a battery controller 150. The battery module 100 may include an integrated battery module in which the adapter 110 and the battery 120 are integrally formed in a single body. The adapter 110 and the battery 120 may be formed in a single monolithic body in the integrated battery module.

The adapter 110 receives an external power from a first external power source and supplies the external power to the battery 120 and a system part 210 included in a computer system 200 of FIGS. 3A and 3B (to be described later). The battery 120 includes a secondary battery which is chargeable. The battery 120 according to the present embodiment is connected to a power supply line to supply the power to the system part 210, is charged with the power or discharged, and may be provided as an auxiliary power source of the system part 210. The battery 120 may include at least one battery cell which has one or more predetermined specifications on charging voltage and output voltage.

The interface 130 may include a battery connector to be connected to the computer system 200. The interface 130 may include a signal detecting pin to detect a detection signal representing supply of a second external power to the computer system. If the battery module 100 according to the present embodiment includes a smart battery, the interface 130 may include a system management bus (SMBUS) to send and receive information on the battery module 100 to an external device, for example, the computer system 200.

The battery connecter of the interface 130 of the battery module 100 may include a power transmission pin to be connectable to the computer system 200 to transmit one of the first external power and the auxiliary power to the computer system 200 therethrough.

The signal detecting pin of the interface 130 is connectable to the computer system 200 to transmit and receive the information and/or a signal, such as the detection signal.

The power switch 140 switches whether to supply a first external power from the adapter 110 to the battery 120 and/or the computer system 200 and whether to supply an auxiliary power from the battery 120 to an external device, for example, the computer system 200. The power switch 140 may include a first switch 140a of FIG. 3B which switches whether to supply the first external power from the adapter 110 to the computer system 200 and/or the battery 120, and a second switch 140b of FIG. 3B which switches whether to supply the auxiliary power from the battery 120 to the computer system 200.

If the detection signal corresponding to the supply of the second external power is transmitted from the computer system 200 and detected by the interface 130 of the battery module 100, the battery controller 150 controls the switch 140 to cut off the first external power supplied from the adapter 110 and the auxiliary power from the battery 120, so that the first external power and/or the auxiliary power are not supplied to the compute system 200 through the interface.

If a residual amount of the battery 120 is equal to or greater than a predetermined value, the battery controller 150 may control the second power switch 140b to stop charging the battery 120, thereby protecting the fully-charged battery 120.

The battery module 100 may include a power port 100a connectable to the first external power source to receive the first external power from the first external power source, and an interface port 100b connectable to the computer system 200 to transmit at least one of the first external power of the first external power source and the auxiliary power of the battery 120 to the computer system 200 and to receive the detection signal from the computer system 200. The detection signal is received from the computer system 200 through the interface port 100b and the interface 130 and transmitted to the battery controller 150 such that the controller 150 controls the power switch 140 according to the detection signal.

When the auxiliary power is supplied from the battery 120 to the computer system 200 through the interface port 100b and the interface 130, the detection signal is generated from the computer system 200 and received by the battery module from the computer system 200 through the interface port 100b and the interface 130, and the battery controller 150 controls the power switch 140 to prevent the auxiliary power from being supplied from the battery 120 to the computer system 200 through the interface port 100b and the interface 130, according to the detection signal.

When the first external power is supplied from the first external power source to the computer system 200 through the power port 100a, the adapter 110, the interface 130, the interface 130 and the interface port 100b, the detection signal is generated from the computer system 200 and received by the battery module 100 from the computer system 200 through the interface port 100b and the interface 130, and the battery controller 150 controls the power switch 140 to prevent the first external power from being supplied to the computer system 200 through the interface 130 and the interface port 100b, according to the detection signal.

Hereinafter, the computer system 200 according to an embodiment of the present general inventive concept will be described in detail with reference to FIGS. 3A and 3B.

Figure 3A:
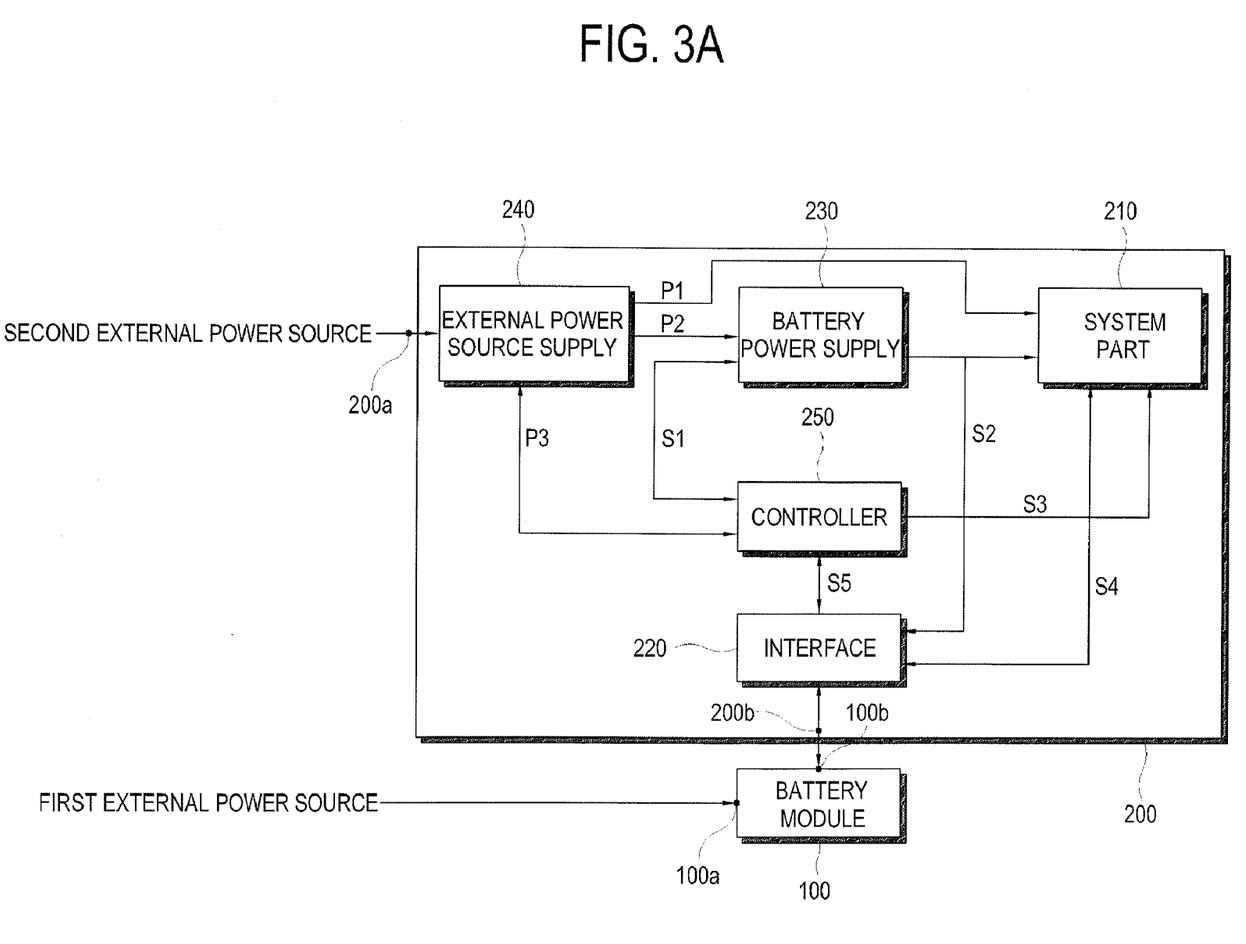
FIGS. 3A and 3B are block diagrams illustrating a computer system according to an embodiment of the present general inventive concept.
Figure 3B:
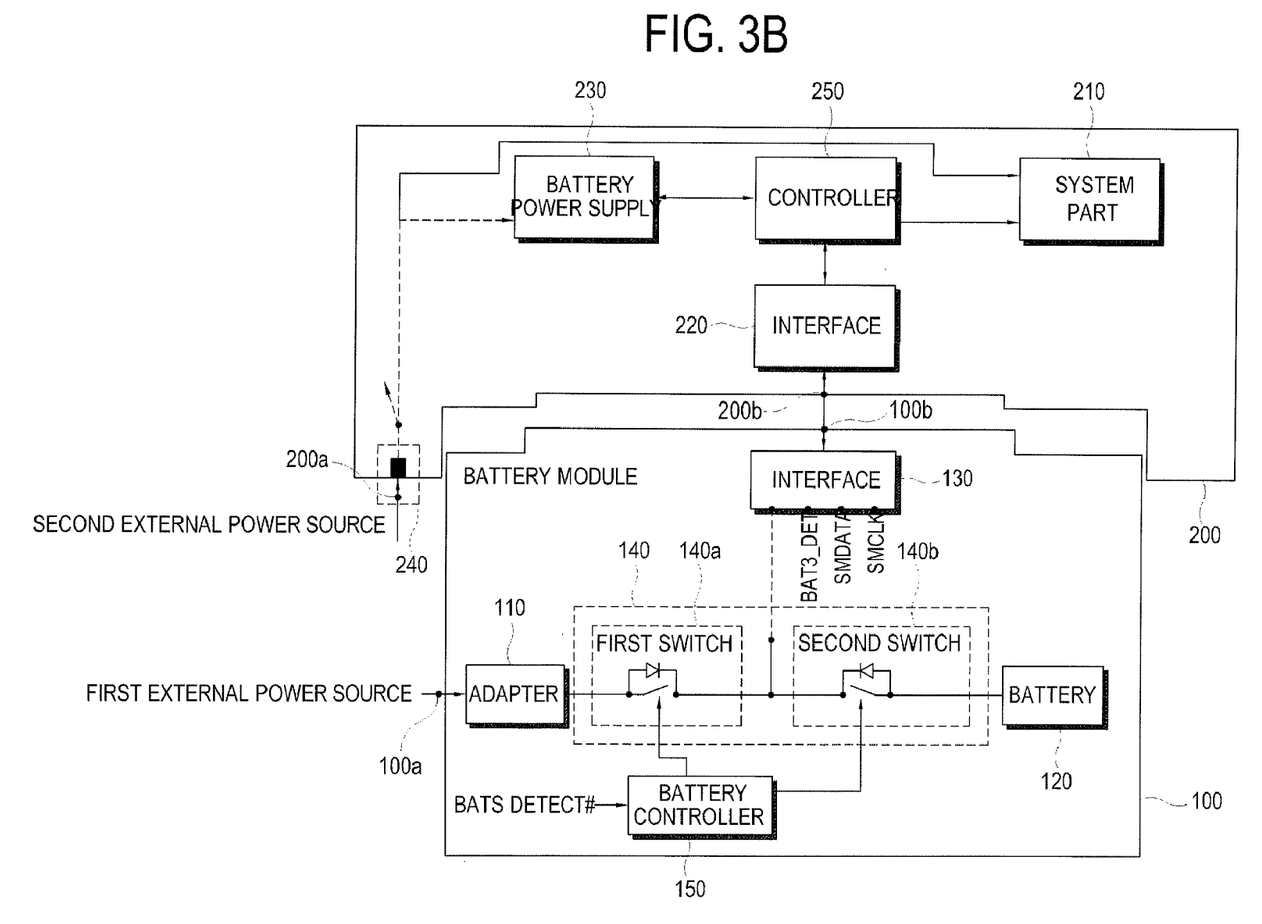

Referring to FIGS. 2, 3A, and 3B, the computer system 200 includes the system part 210, a system interface 220, a battery power supply 230, an external power supply 240, a system power switch (not illustrated), and a controller 250. The computer system 200 according to the present embodiment may be a portable computer, such as a notebook computer and a personal digital assistant (PDA). The computer system 200 may receive a power from the battery module 100 in which the adapter 110 and the battery 120 are integrally formed. The power received by the computer system 200 from the battery module 100 may be one of the first external power and the auxiliary power of the battery 120.

The computer system 200 may include a system power port 200a connectable to a second external power source to receive a second external power from the second external power source, and a system interface port 200b connectable to the interface port 100b of the battery module 100 to receive the one of the first external power and the auxiliary power of the battery 120 from the battery module 100. The detection signal is generated from the computer system 200 and is transmitted to the battery module 100 through the system interface port 200b and the interface port 100b.

The system part 210 includes a plurality of electronic components to perform main functions of the computer system 200. If the computer system 200 according to the present embodiment includes a portable computer, the electronic components of the system part 210 may include a central processing unit (CPU), a random access memory (RAM), a chipset, a main board, a graphic card, and other conventional electronic components.

The system part 210 may include a DC/DC converter (not shown) which converts inputted power into power of voltage levels to drive the respective electronic components. The DC/DC converter may include a switching voltage regulator which generates power of the respective voltage levels.

The system interface 220 is connected with the battery module 100 through the system interface port 200b and the interface port 100b. The battery module includes the battery 120 branched from the part of the power supply line between the first external power source and the system part 210 to supply the auxiliary power to the system part 210 through the system interface 220 and the system interface port 200b, and the adapter 110 to supply the first external power to the system part 210 and the battery 120. The system interface 220 according to the present embodiment may include a battery connecter to be connected with the battery module 100.

The battery connecter of the system interface 220 may include a system power transmission pin connectable to a power transmission pin of the interface 130 of the battery module 100 through the system interface port 200b and the interface module 100b such that the one of the first external power and the auxiliary power is supplied to the computer system 200 through the power transmission pin.

The system interface 220 may include a signal detecting pin to be connectable to a signal detecting pin of the interface 130 of the battery module 200 through the system interface port 200b and the interface port 100b to transmit and receive the information and/or a signal, such as the detection signal representing that the second external power is supplied to the computer part 210 of the computer system 200.

If the battery module 100 is mounted in the computer system 200, the battery power supply 230 computer system 200 (shown in FIG. 3B) controls at least one of the controller 250, the system interface 220, and the system part 210 such that the auxiliary power of the battery 120 is supplied to the computer system 200 through the system interface port 200b and the interface port 100b using signal lines S1, S2, S3, and S4.

The external power supply 240 is connected with an adapter, i.e., the second external power source, through the system power port 200a to receive the second external power and to supply the second external power to the system part 210, the battery power supply 230, and/or the controller 250 using signal lines S1, S2, and/or S3, respectively. The second external power supplied through the external power supply 240 is different from the first external power supplied from the adapter 110 of the battery module 100.

According to the present embodiment, one of the computer system 200 and the battery module 100 may include a system power switch to switch whether to supply or not at least one of the first external power from the adapter 110 and the auxiliary power from the battery 120 to the computer system 200. The system power switch according to the present embodiment may be included in the battery module 100 as the power switch 140. The system power switch may include a system first switch which switches whether to supply or not the first external power from the adapter 110 and a system second switch which switches whether to supply or not the auxiliary power from the battery 120. If the power switch 140 is provided in the battery module 100, the computer system 200 may not include the system power switch.

The controller 250 controls the interface 220 using a signal line S5 to cut off the first external power supplied from the adapter 110 if the second external power is supplied through the external power supply 240. The controller 250 according to the present embodiment may include an integrated circuit (IC) to receive a detection signal corresponding to the supply of the second external power and transmit a control signal to cut off the supply of the first external power.

The controller 250 is connected to at least one of the battery power supply 230 and the external power source supply 240 as a detector to detect the existence of the power, and to generate the detection signal through the system interface 220 using a signal line S5, according to at least one signal of at least one of the signal lines P3 and S1.

If the system first switch and the system second switch are provided in the system power switch of the computer system 200 to switch whether to respectively supply the first external power and the auxiliary power, and if the adapter as the second external power source is connected to the external power supply 240 through the system power port 200a to receive and supply the second external power, the controller 250 may control the system power switch by a detection signal generated from one of the battery power supply 230, the external power source supply 240, and the controller 250 according to the supply of the second external power.

If the second external power which is independent from the first external power is supplied, the controller 250 may cut off the first external power supplied from the adapter 110 and the auxiliary power from the battery 120, thereby preventing conflict between the plurality of external power and the auxiliary power.

If the residual amount of the battery 120 is equal to or greater than a predetermined value, the controller 250 may control the system second switch to stop charging the battery 120 with the external power. Thus, the battery 120 may be protected after being fully charged.

Referring to FIG. 3B, the interface 130 includes pins (or terminals) to transmit a clock signal SMCLK, a data signal SMDATA, a detection signal BATS DETECT#, and so on which are necessary to form communications between the battery module 100 and the computer system 200. A common line can be used to transmit the detection signal BATS DETECT# and the data signal SMDATA. It is possible that the data signal SMDATA includes the detection signal BATS DETECT#. The detection signal BATS DETECT# is transmitted to the battery controller 150, and the battery controller 150 controls the power switch 140 according to a characteristic of the detection signal BATS DETECT#.

The battery power supply 230 may include a battery to be charged with the second external power and to be discharged to supply another auxiliary power to the system part 210. When the second external power source is disconnected or the second external power is not supplied to the computer system 200, the another auxiliary power of the battery of the battery power supply 230 can be transmitted to the system part 210 and components of the computer system 200. When one of the second external power and the another auxiliary power is supplied to the computer part 210, the detection signal is transmitted to the battery module 100 according to the supply of the another auxiliary power, so that the one of the first external power and the auxiliary power is not supplied to the computer system 200.

Figure 4:
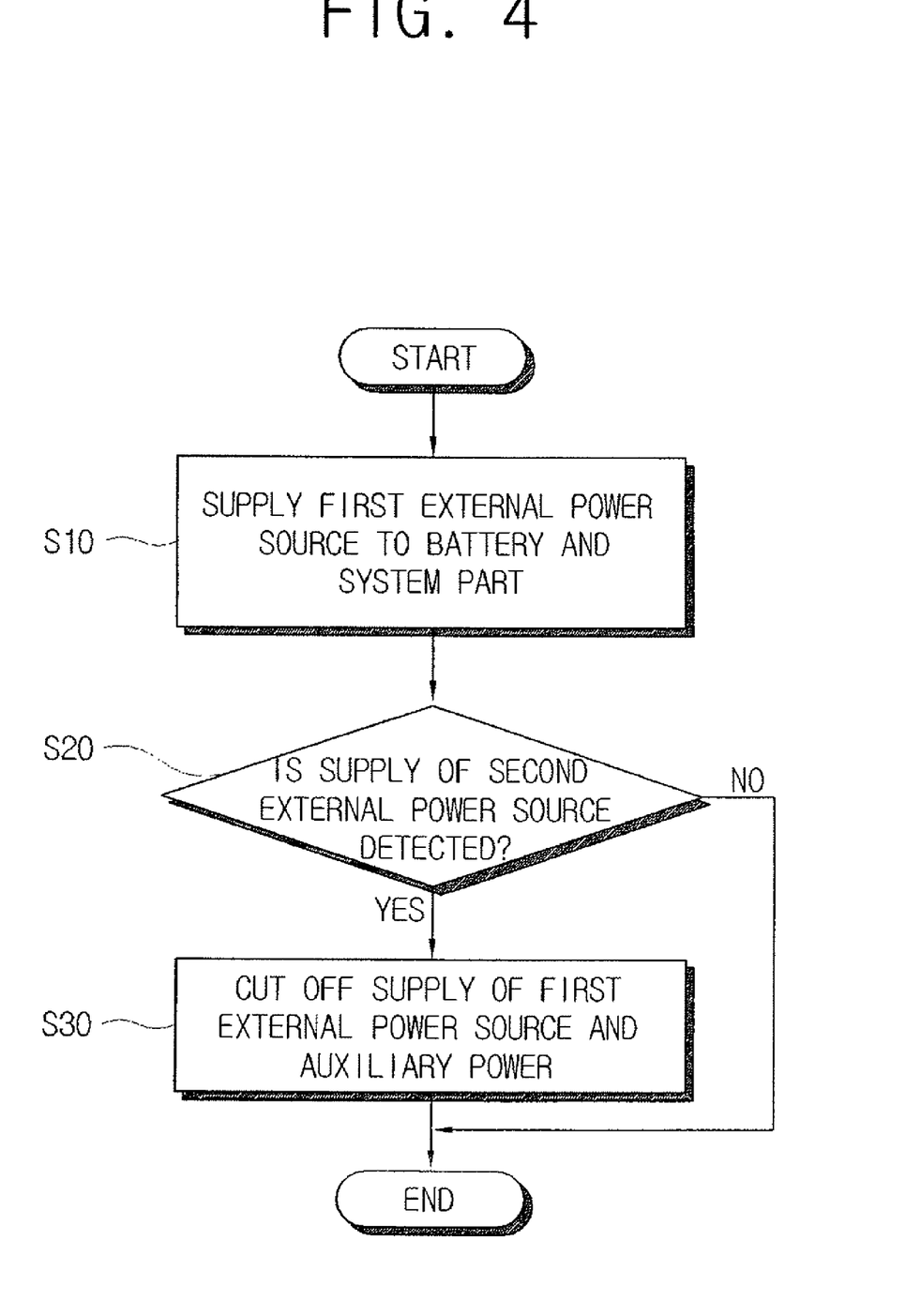
FIG. 4 is a flowchart illustrating a power supply method of a battery module and a computer system according to en embodiment of the present general inventive concept.

Hereinafter, a power supply method of the battery module 200 of FIGS. 2, 3A, and 3B according to an embodiment of the present general inventive concept will be described with reference to FIG. 4.

First, the battery controller 150 controls to supply the first external power to the system part 210 and the battery 120 through the adapter 110 (S10). The battery controller 150 determines whether the detection signal is received corresponding to the supply of the second external power (S20). The battery controller 150 cuts off the supply of the first external power and the auxiliary power if the detection signal corresponding to the supply of the second external power is received (S30).

A power supply method of the computer system 200 of FIGS. 3A and 3B according to an embodiment of the present general inventive concept will be described with reference to FIG. 4.

The controller 250 controls the battery controller 150 to supply the first external power to the system part 210 and the battery 120 through the adapter 110 of the battery module 100 mounted in the computer system 200 (S10). Here, the controller 250 may control the battery 120 to be charged with the first external power or to be discharged to supply the auxiliary power to the system part 210. The battery 120 is branched from the part of the power supply line between the first external power and the system part 210. If the residual amount of the battery 120 is equal to or greater than the predetermined value, the controller 250 may control to stop charging the battery 120 according to information transmitted through the interfaces 130 and 220.

The controller 250 determines whether the second external power is supplied through the external power supply 240 (S20). If the second external power is supplied through the external power supply 240, the controller 250 cuts off the first external power supplied to the system part 210 and the battery 120 (S30).

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, the present general inventive concept provides a battery module, which has an adapter and a battery as a single body and prevents conflict between external power sources, and a computer system and a power supply method thereof.

Also, the present general inventive concept provides a battery module which has a simplified power supply configuration by removing a cable and a switch to prevent conflict between external power sources, and a computer system and a power supply method thereof.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A battery module usable with a computer system, the battery module comprising:
   a power port to receive an external power;
   a battery to output an auxiliary power;
   an interface port to receive an external signal; and
   a controller to output a power through the interface port, and to prevent the power from being transmitted to the interface port according to the external signal received through the interface port, and
   wherein the interface port is connectable to an external computer system to receive the external signal from and generated by the external computer system, and the external signal represents that the external computer system receives a second power from an external power source other than the power from the interface port,
   wherein the controller selectively supplies one of the external power and the auxiliary power as the power to the interface port, and prevents at least the one of the external power and the auxiliary power from being transmitted to the interface port, according to the external signal.

2. The battery module of claim 1, wherein the power is transmitted to the external computer system through the interface port.

3. The battery module of claim 1, wherein the interface port is connectable to an external computer system to receive the external signal from the external computer system, such that the power is supplied to the external computer system through the interface port and the external signal is supplied from the external computer system to the controller through the interface port.

4. The battery module of claim 1, wherein the interface port comprises a plurality of signal lines, and the power and the external signal are transmitted through corresponding ones of the plurality of signal lines of the interface port.

5. The battery module of claim 1, further comprising:
an interface connected to the interface port to transmit the power to the interface port and to transmit the external signal received from the interface port to the controller.

6. The battery module of claim 5, wherein the interface comprises a power line to transmit the power and a data line to transmit the external signal.

7. The battery module of claim 1,
wherein the controller prevents the auxiliary power from being transmitted to the interface port according to the external signal received through the interface port.

8. The battery module of claim 1, further comprising:
a switch connected between the interface port and at least one of the power port and the battery,
wherein the controller controls the switch to supply the external power to the battery to charge the battery, and to supply the external power to the interface port as the power.

9. A battery module usable with a computer system, the battery module comprising:
a power port to receive an external power;
a battery to output an auxiliary power;
a circuit to generate a power; and
a controller to output the power of the circuit to an external device, and to prevent the power from being output from the circuit to the external device according to an external signal received from and generated by the external device, and
wherein the external signal represents that the external device receives a second power from an external power source other than the power from the circuit, and
wherein the external device is the computer system,
wherein the controller selectively supplies one of the external power and the auxiliary power as the power to the external device, and prevents at least the one of the external power and the auxiliary power from being transmitted to the external device, according to the external signal.

10. A battery module usable with a computer system, the battery module comprising:
a power port to receive an external power;
a battery to output an auxiliary power;
an interface port connectable to an external device;
an interface to receive an external signal received from and generated by the external device through the interface port; and
a controller to control the interface to output a power through the interface port, and to prevent the power from being transmitted to the interface according to the received external signal, and
wherein the external signal represents that the external device receives a second power from an external power source other than the power from the interface port, and
wherein the external device is the computer system,
wherein the controller selectively supplies one of the external power and the auxiliary power as the power to the interface port, and prevents at least the one of the external power and the auxiliary power from being transmitted to the interface port, according to the external signal.

11. A battery module usable with a computer system, the battery module comprising:
an interface port to receive an external signal generated from an external device;
a circuit to output a power;
an interface connected between the circuit and the interface port; and
a controller to control at least one of the circuit and the interface to output the power through the interface port, and to prevent the power from being transmitted to the interface port according to the received external signal, and
wherein the external signal represents that the external device receives a second power from an external power source other than the power from the interface port, and
wherein the external device is the computer system,
wherein the circuit comprises an adapter to generate an external power and a battery to generate an auxiliary power, and the controller selectively outputs one of the external power and the auxiliary power as the power.

12. The battery module of claim 11, wherein the adapter and the battery are formed in a single body.

13. A battery module usable with a computer system, comprising:
a power port to receive a first power from a first external power source;
a battery to generate an auxiliary power;
an interface port connectable to an external computer system; and
a controller to transmit one of the first power and the auxiliary power to the interface port, and to prevent the first power and the auxiliary power from being transmitted to the interface port according to a signal received from and generated by the external computer system through the interface port.

14. A computer system comprising:
a computer body comprising a system interface port connectable to an interface port of an external battery module to receive a power from the external battery module, and a controller to generate an external signal to the interface port of the external battery module through the system interface port such that the external battery module terminates the supply of the power through the interface port according to an existence of another power other than the power of the external battery module,
wherein the external battery module includes an adapter to receive an external power and a battery to generate an auxiliary power, and the external battery module selectively outputs one of the external power and the auxiliary power as the power of the external battery module.

15. A computer system comprising:
a system part;
a circuit to generate a power to the system part;
a second circuit to receive another power from an external device to be supplied to the system part; and
a controller to generate a detection signal to the external device according to the existence of the power of the circuit such that the external device terminates the supply of the another power to the second circuit based on the detection signal;
wherein the external device comprises an adapter to generate an external power and a battery to generate an auxiliary power, and the controller selectively outputs one of the external power and the auxiliary power as the power.

16. A computer system comprising:

a battery module comprising a port and a controller to transmit a power to the port and to prevent the power from being transmitted to the port according to a signal received through the port; and a computer body comprising another port connectable to the port of the battery module and another controller to transmit the signal to the port through the another port according to existence of another power other than the battery module, so that the battery module does not transmit the power to the another port through the port, wherein the battery module includes an adapter to receive an external power and a battery to generate an auxiliary power, and the controller of the battery module selectively outputs one of the external power and the auxiliary power as the power.

17. A method of a computer system, the method comprising:

receiving a power from an external battery module;

generating an external signal by the computer system to the external battery module when receiving another power other than the power of the external battery module; and outputting the external signal to the external battery module so that the external battery module terminates the supply of the power according to the external signal, wherein the external battery module includes an adapter to receive an external power and a battery to generate an auxiliary power, and the external battery module selectively outputs one of the external power and the auxiliary power as the power of the external battery module.

18. A method of a computer system having a battery module, the method comprising:

connecting a battery module to a computer system;

controlling the battery module to output a power from the battery module to the computer system;

controlling the computer system to generate an external signal when the computer receives another power other than the power of the battery module;

controlling the computer system to output the external signal to the battery module; and controlling the battery module to prevent the power from being transmitted from the battery module to the computer system according to the external signal, wherein the battery module includes an adapter to receive an external power and a battery to generate an auxiliary power, and the controlling the battery module to output the power includes controlling the battery module to selectively output one of the external power and the auxiliary power as the power.

* * * * *